US012702247B2

(12) United States Patent
Nabeiro et al.

(10) Patent No.: US 12,702,247 B2
(45) Date of Patent: Aug. 11, 2026

(54) DRINKING RECIPIENTS WITH FLOW REGULATION MEANS OF MINIMAL CONSTRUCTION, SYSTEMS AND PROCESSES WITH SAID DRINKING RECIPIENTS

(71) Applicant: NOVADELTA—COMÉRCIO E INDÚSTRIA DE CAFÉS, LDA, Lisbon (PT)

(72) Inventors: Rui Miguel Nabeiro, Campo Maior (PT); Jesús Medina Mundt, Lisbon (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 1106 days.

(21) Appl. No.: 17/769,091

(22) PCT Filed: Oct. 28, 2020

(86) PCT No.: PCT/PT2020/050038
§ 371 (c)(1),
(2) Date: Apr. 14, 2022

(87) PCT Pub. No.: WO2021/086216
PCT Pub. Date: May 6, 2021

(65) Prior Publication Data

US 2024/0099500 A1 Mar. 28, 2024

(30) Foreign Application Priority Data

Oct. 31, 2019 (PT) ........................................ 115874

(51) Int. Cl.
*A47J 31/46* (2006.01)
*A47J 31/44* (2006.01)
*A47J 31/52* (2006.01)

(52) U.S. Cl.
CPC ......... *A47J 31/461* (2018.08); *A47J 31/4425* (2013.01); *A47J 31/52* (2013.01)

(58) Field of Classification Search
CPC ...... A47J 31/461; A47J 31/4425; A47J 31/52; F16K 15/147; F16K 15/1402;
(Continued)

(56) References Cited

U.S. PATENT DOCUMENTS

2004/0222229 A1* 11/2004 Gabbard ............ A47G 19/2272 220/714
2008/0223478 A1* 9/2008 Hantsoo ............... B67D 1/0894 141/2

(Continued)

FOREIGN PATENT DOCUMENTS

DE 10 2009 048 233 A1 4/2010
WO 2016/071880 A1 5/2016

(Continued)

OTHER PUBLICATIONS

Written Opinion for PCT/PT2020/050038, dated Jan. 22, 2021.
International Search Report for PCT/PT2020/050038, dated Jan. 22, 2021.

*Primary Examiner* — Christopher M Afful
(74) *Attorney, Agent, or Firm* — Sughrue Mion, PLLC

(57) ABSTRACT

Drinking recipients such as glasses, cups and the like, that present a flow regulation mechanism at a base region and is adapted to provide better retention, use longevity and reliability, and better regulation of the flow passage there through, at least for flow pressures of up to 20 bar, and to simultaneously provide liquid sealing relative to an injection device upstream. Further disclosed are systems and processes for distributing beverages, in particular of espresso coffee and similar aromatic beverages, having at least one type of said drinking recipient, and an apparatus having a beverage discharge disposition adapted for operative reten- (Continued)

tion of the drinking recipient and for beverage discharge in a pressurized flow through the base region, at least for flow pressures of up to 20 bar.

18 Claims, 8 Drawing Sheets

(58) Field of Classification Search
CPC . F16K 15/023; B67C 2003/2654; B65D 1/06; B67D 2001/0814
USPC .......................................................... 141/113
See application file for complete search history.

(56) References Cited

U.S. PATENT DOCUMENTS

| | | | | |
|---|---|---|---|---|
| 2011/0121020 | A1* | 5/2011 | Springer | A47G 19/2205 222/23 |
| 2014/0373973 | A1* | 12/2014 | Windmiller | B65D 47/248 141/113 |
| 2016/0305558 | A1* | 10/2016 | Uitbeijerse | F16K 15/147 |
| 2017/0035242 | A1 | 2/2017 | Kollep et al. | |
| 2019/0282023 | A1* | 9/2019 | Nabeiro | A47J 31/461 |

FOREIGN PATENT DOCUMENTS

| | | | |
|---|---|---|---|
| WO | 2017/200409 | A1 | 11/2017 |
| WO | 2018/194475 | A1 | 10/2018 |
| WO | 2019/078748 | A1 | 4/2019 |

* cited by examiner

DRINKING RECIPIENTS WITH FLOW REGULATION MEANS OF MINIMAL CONSTRUCTION, SYSTEMS AND PROCESSES WITH SAID DRINKING RECIPIENTS

CROSS REFERENCE TO RELATED APPLICATIONS

This application is a National Stage of International Application No. PCT/JP2020/050038 filed Oct. 28, 2020, claiming priority based on Portugal Patent Application No. 115874 filed Oct. 31, 2019.

FIELD OF THE INVENTION

The present invention refers to the field of the drinking recipients, in particular for aromatic beverages, whereby the beverage discharge into the recipient takes place in a direction opposite to the direction of the gravity force, and to systems and process for preparing beverages based upon the use of said drinking recipients.

BACKGROUND OF THE INVENTION

The prior art presents several solutions of apparatus with beverage discharge in a direction opposite to the direction of the gravity force. In particular, in the case of beverage preparation systems based upon an individual portion of precursor substance, such as for example a capsule or a pod containing roasted ground coffee beans, or other edible substance, in each preparation cycle there is an introduction of said individual portion in a beverage preparation device and posterior ejection thereof out of such device after beverage preparation and discharge. Said beverage preparation device can be automatically actuated, for example by means of an electric motor, between open and closed position, and thereby collect and eject said individual portion.

The document DE 10 2009 048233 A1 discloses a drinking recipient adapted so that can collect a pressurized beverage flow through a base region thereof, presenting a blocking element provided so that it is tensioned up in a closed position, in particular by an elastic string, and can be displaced to an open position where it provides flow passage to the drinking recipient.

The document US 2008/0223478 A1 discloses a drinking recipient with flow regulation means such as a duckbill valve, an umbrella valve, or a permeable membrane, and that can be retained by means of pressured-fitting in a retention opening provided on the base wall of said recipient.

The document WO 2016/071880 A1 discloses another drinking recipient of the type of the present invention that presents a valve in the base region thereof comprising a deformable element that is mounted under pressure in a sealing position to liquid-leaks, and can be deformed in the filling position when the flow pressure reaches a previously determined compression value of said deformable element.

The document WO 2017/200409 A1 filed by the author of the present invention, relates to a beverage preparation system of the type of the present invention, comprising drinking recipients adapted so that can be operatively retained in the beverage discharge disposition of beverage preparation apparatuses. In particular, this document discloses more ergonomic solutions of general configuration of the apparatus and communication interfaces thereof. Moreover, the document further discloses a process for preparing a beverage that includes the detection of operative state of the flow pressurization device, as well as the placement and correct placement of the drinking recipient on the beverage discharge disposition, whereby said flow pressurization device is prevented from operating as long as there detected the non-placement or the incorrect placement of the drinking recipient on the beverage discharge. This measure of operation control advantageously provides more reliability and safety of use of a system of this type. Said process further includes the display of information of operational state relating to the correct placement of the drinking recipient.

The document WO 2018/194475 A1 also filed by the author of the present invention, is also related to a beverage preparation system of the type of the present invention. In particular, this document discloses a drinking recipient with means and dispositions for optimizing the flow passage through a portion of the base region of said drinking recipient, to the collection space thereof.

The document WO 2019/078748 A1 also filed by the author of the present invention, discloses a drinking recipient that presents flow regulation means of umbrella valve type retained on a base wall thereof.

None of the documents in the prior art discloses a solution that provides a drinking recipient with enhanced flow regulation means, in particular of simple construction and reliable and effective performance.

GENERAL DESCRIPTION OF THE INVENTION

The objective of the present invention is to provide drinking recipients, such as for example glasses, cups and similar items, presenting flow regulation means in a base region thereof, adapted and arranged so that provide better regulation of flow passage, and so that simultaneously provide a reliable liquid sealing relative to pressurized beverage injection means upstream thereof.

Said flow regulation means can be of the single-way valve type, including umbrella valve, duckbill valve, and similar.

In particular, the objective of the present invention is to provide flow regulation means that are simple and efficient.

This objective is attained according to the present invention by means of a drinking recipient according to claim 1, whereby preferred embodiments are presented in the depending claims.

In particular, this objective is solved according to the present invention by means of drinking recipients that present flow regulation means provided as a single piece, preferentially in a synthetic material with elastic behaviour.

The objective can be solved by means of drinking recipients that comprise flow regulation means adapted so that can confine a space of tubular section upstream of flow regulation wall that presents at least one slot-like opening for flow passage adapted so that can be opened in at least partially elastic manner, preferentially in elastic manner, in case of being impinged with an upstream flow pressure that is bigger than a previously defined value of flow pressure, whereby said flow passageway presents a characteristic dimension, in particular extension between edges, comprised between 1 and 10 mm, preferentially between 1.5 and 5 mm.

Said flow regulation wall can extend with a semi-sphere or a part of sphere-like shape, with the concavity oriented upstream, and said flow passageway can be configured so that extends along a single linear extension and adapted so that can be opened in at least partially elastic manner, preferentially in elastic manner, in case that said flow regulation wall is impinged with an upstream flow pressure that is bigger than a previously defined value of flow pressure.

It is preferred when said flow pressure for opening the flow passageway is bigger than 1,5 bar, preferentially bigger than 1,8 bar, and smaller than 20 bar, preferentially smaller than 18 bar.

Another objective of the present invention is to provide a drinking recipient with a single-way valve that provides a greater number of uses, before entering into material fatigue, or relaxing the elastic behaviour associated with respective flow passageway.

This objective is solved according to the present invention by means of flow regulation means, of single-way valve type, whereby an upstream portion presents a material surface that extends transversally, for example in rim-like manner, relative to a flow passage section laterally surrounded by an elastic sidewall. Said material extension advantageously presents a characteristic dimension, for example a diameter, that corresponds to at least twice the characteristic dimension of the flow passage section, for example the diameter thereof.

Said material surface is adapted so that can be impinged, including compressed, by the beverage discharge means when the drinking recipient is placed in operative position in a beverage discharge disposition of an apparatus, thereby providing the only liquid sealing of the drinking recipient with the beverage discharge means.

A related objective of the present invention is to provide a drinking recipient whereby it is easier to place said flow regulation means in a respective retention seat, retain them thereon in reliable manner and easily replacing them, in particular manually without requiring the use of a tool for such purpose.

In particular, this objective is solved by flow regulation means adapted so that can be retained by means of pressured-fitting in a retention portion of the base wall of the drinking recipient, and are thereby additionally retained by a seating portion associated with said retention portion of the base wall.

Another objective of the present invention is to disclose a beverage preparation system including a beverage preparation apparatus providing more efficient and ergonomic operation, including for discharge of different types of beverages.

This objective is solved according to claim 14.

In particular, this objective is attained with a drinking recipient according to any of claims 1 to 13.

The system can further include an individual portion of edible substance, eventually including a package for collection thereof, for example of the type capsule, pod, edible coating or similar, and said apparatus can comprise at least one beverage preparation device, in particular for brewing aromatic beverages, such as for example espresso type coffee, adapted so that be driven by an actuation device, such as for example an electric motor, and thereby collect said individual portion of edible substance, and a beverage discharge disposition adapted so that can discharge in a direction opposite to the direction of the gravity force.

Said apparatus can further present control means adapted so as to provide a simpler and more ergonomic operation of the apparatus in general, and of each beverage preparation cycle in particular.

Another objective of the present invention is to disclose a process for preparing beverages providing enhanced sealed retention of a drinking recipient in a beverage discharge disposition.

This objective is solved according to claim 15.

In particular, this objective is attained with processes that include providing a drinking recipient according to any of claims 1 to 13, and/or in a system according to claim 14.

Process according to the present invention can include the replacement of flow regulation means, in particular without the use of a tool for such purpose.

Processes can further include the following steps:

providing a drinking recipient;

removing first flow regulation means from retention in the base wall of the drinking recipient;

placing second flow regulation means retained on the base wall, in particular by means of inserting them into an upstream-oriented side of the base opening in the base wall of the drinking recipient;

whereby:

at least one of said removal and placement can be realized manually, without requiring the use of a tool;

said placement includes applying pressure, preferentially only manually, upon said second flow regulation means so as to provide the pressured-fitting thereof on a seating portion of the base wall of drinking recipient.

DESCRIPTION OF THE FIGURES

The invention shall be hereinafter explained in greater detail based upon preferred embodiments and the attached Figures.

The Figures show, in simplified schematic representations.

DETAILED DESCRIPTION OF PREFERRED EMBODIMENTS OF THE INVENTION

Figure 1:
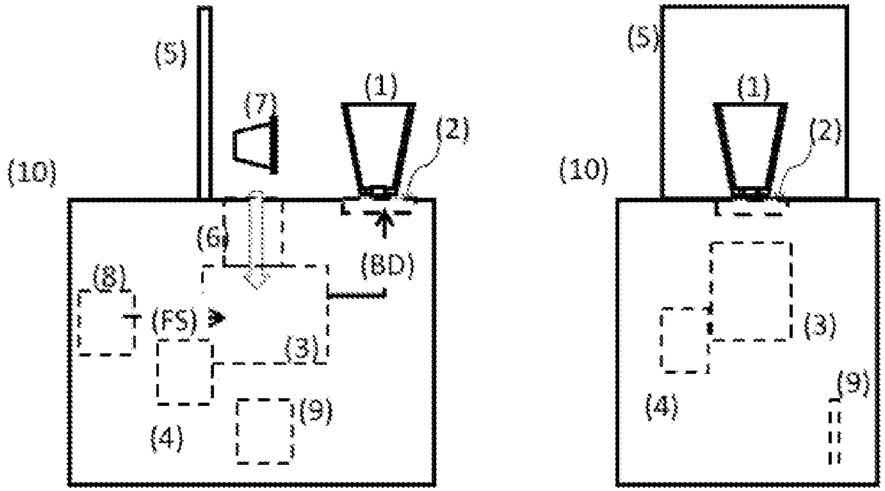
FIG. 1: side and top view of a first embodiment of drinking recipient (1) and beverage preparation apparatus (10) in a system according to the present invention.

FIG. 1 represents side (on the left-hand side of the drawing) and frontal views of an embodiment of beverage preparation system according to the present invention that includes a drinking recipient (1), an individual portion (7) of a beverage precursor substance, for example in the form of a capsule such as referenced in the drawings, or similar, and a beverage preparation apparatus (10).

Said apparatus (10) can include a fluid reservoir (not represented), as well as fluid heating means, for example a thermoblock (not represented), and a flow pressurization device (8), for example a hydraulic pump, so that can provide a fluid supply (FS) at a temperature comprised between 60 and 100° C. and at a pressure comprised between 1 and 20 bar, preferentially between 8 and 16 bar, so as to interact with said edible substance. These means are known to the expert in the field so that one abdicates from a more detailed representation or description thereof.

Moreover, said apparatus (10) presents a beverage preparation device (3), referred to in the drawings as extraction device, provided so that can collect said individual portion (7), and impinge the latter with the pressurized flow (FS) so that mixes with the edible substance and results in a beverage. Said beverage preparation device (3) can be driven between open and closed positions, and vice-versa, by means of an actuation device (4), such as for example an electric motor. The individual portion (7) can be supplied to the beverage preparation device (3) by insertion into a respective portion inlet (6). An access disposition (5) configured as actionable lid-like element, can enable access to the portion inlet (6). Other possibilities of supply individual portions (7) are not excluded from the scope of the present invention. Operation of the apparatus (10), including of the flow pressurization (8) and beverage preparation device (3), can be regulated by control means (9).

After preparing the beverage, the flow beverage (BD) is conducted from an exit of the extraction device (3) to a beverage discharge disposition (2) arranged downstream thereof so that the beverage discharge to the interior of said drinking do drinking recipient (1) takes place through the base region thereof.

In the case of this preferred embodiment, the apparatus (10) further presents an access disposition (5) adapted so that can be moved between a first and a second position where it provides access to the beverage discharge disposition (2) for placement of the drinking recipient (1), and vice-versa.

Said apparatus (10) further comprises control means (9) adapted so that can control the operation of several components of the apparatus (10), including of said actuation device (4), and the display of information to a user.

Figure 2:
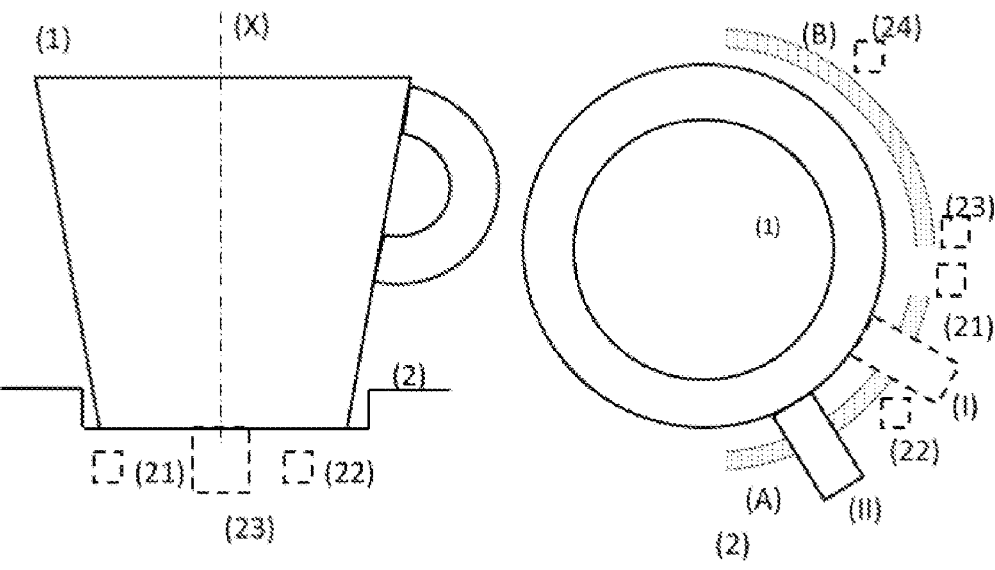
FIG. 2: side and top view of a drinking recipient (1) placed on a beverage discharge disposition (2) of apparatus (10) of a system according to the present invention.

FIG. 2 diagrammatically represents the placement of drinking recipient (1) on a beverage discharge disposition (2). In particular, the drinking recipient (1) can be placed by the user in a first retention position, associated with a previously defined handling alignment (A), where along it is correctly retained, and hereinafter be manipulated by the user along said handling alignment (A), thereby actuating a first and a second recipient sensor (21, 22).

It is preferred when the drinking recipient (1) can be retained by means of rotation by a first angular extension around its longitudinal central axis (X), and then be manipulated in further angular extensions of the rotation movement, in either direction, along the handling alignment (A).

It is preferred when the first recipient sensor (21) is associated with a position of retention of the drinking recipient (1) on the beverage discharge disposition (2).

It is preferred when the second recipient sensor (22) is associated with a previously defined extension of said handling alignment (A) whose relative dimension can be associated in each cycle by the control means (9) to a corresponding quantity of beverage to be discharged.

It is preferred when said handling alignment (A) extends around the exterior perimeter of the drinking recipient (1) placed on the beverage discharge disposition (2), in particular so that the second recipient sensor (22) can be actuated by the further rotation of the drinking recipient (1) around a central longitudinal axis (X), between a first (I) and a second position (II).

The beverage discharge disposition (2) can present a second handling alignment (B), for example associated with a different type of beverage discharge, or to a second type of beverage, such as for example tea. A third recipient sensor (24) is in this case further associated with said second handling alignment (B).

Figure 3:
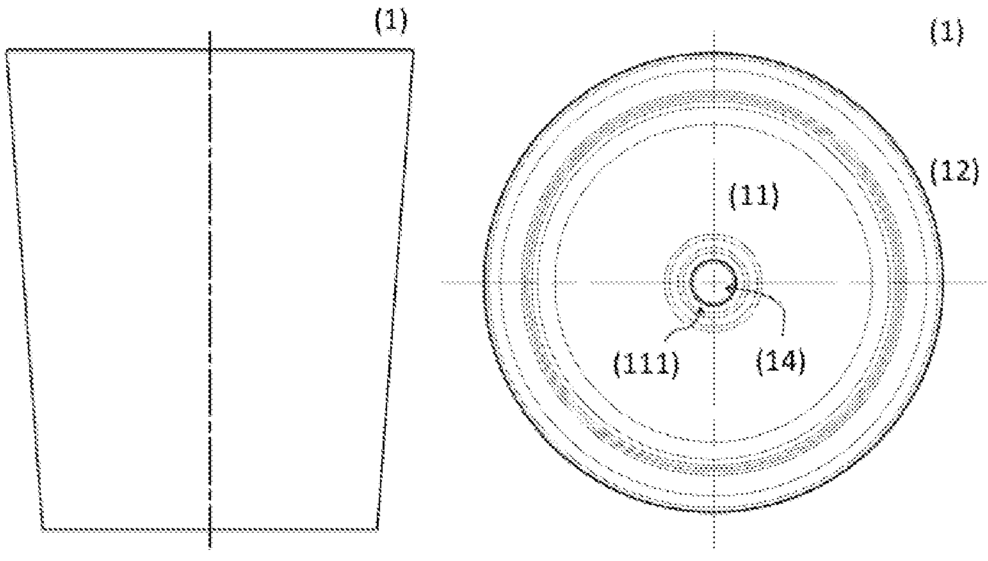
FIG. 3: side and top view of an embodiment of drinking recipient (1) according to the present invention.

A drinking recipient (1) according to the present invention is represented in FIG. 3, presenting a base wall (11) and a sidewall (12) confining a collection volume and configuring a drinking opening.

The drinking recipient (1) presents a base opening no the base wall (11) that can further present a flow obstacle wall (14) configured so as to provide a deflection of the beverage flow at the entry region of the collection space, so that the beverage flows along a generally non vertical direction. These elements are known from prior art so that one herewith abdicates form a description in greater detail thereof.

Figure 4:
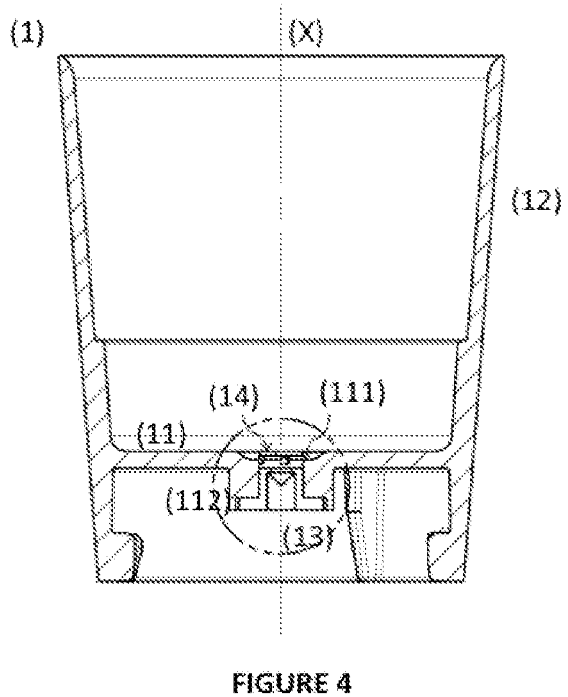
FIG. 4: side-cut view of the embodiment of drinking recipient (1) according to FIG. 3.
Figure 5:
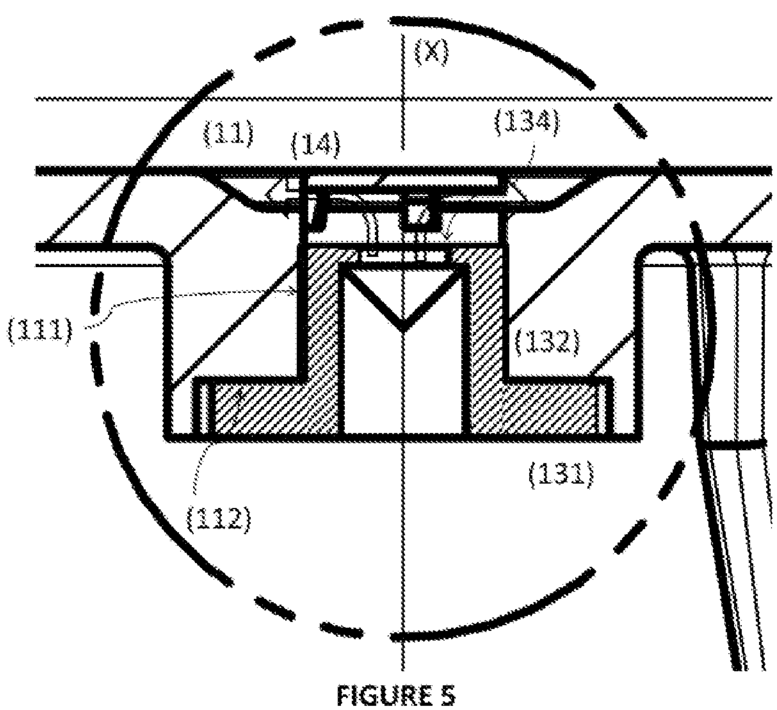
FIG. 5: detail view of flow regulation means (13) in the embodiment according to FIG. 4.

As can be better observed in FIGS. 4 and 5, the base wall (11) presents a base opening generally extending in the prevailing flow direction of beverage discharge (BD) and comprises flow regulation means (13), in particular of single-way valve type, adapted so that only provide flow passage in case of being impinged with an upstream flow pressure bigger than a previously defined value of flow pressure.

The base opening comprises a retention portion (111) que extends with tubular shape along a direction parallel to the prevailing flow direction, and a seating portion (112) that extends along a direction generally transversal relative to the prevailing flow direction.

In the case of the represented embodiments, the flow regulation means (13) are retained by means of pressurized fitting at least on said retention portion (111), preferentially also on said seating portion (112) of the base opening on the base wall (11).

In general, the flow regulation means (13) can present an upstream portion (131) that extends according to one of:

- completely inside of the base wall (11), including at least in the most part of its extension along the prevailing flow direction, inside of said retention portion (111);
- at least partially outside of the base wall (11), preferentially in a smaller part of its extension along the prevailing flow direction, adjacent to the upstream-oriented side thereof.

In general, the flow regulation means (13) can further present a downstream portion (132) that extends completely inside of the base wall (11) and according to at least one of:

- inside of the retention portion (111) at least along the most part of its extension along the prevailing flow direction;
- at least partially outside of said retention portion (111), preferentially in a smaller part of its extension along the prevailing flow direction, adjacent to the downstream-oriented side thereof.

In general, the drinking recipient (1) can be adapted so that can be operatively placed on a beverage discharge disposition (2) functionally connected to a beverage preparation apparatus, in particular so that the drinking recipient (1) can be retained, preferentially by means of mechanical engagement of base region with the beverage discharge disposition (2).

Moreover, in general, the drinking recipient (1) can further present flow constraining means (14) associated with said base opening, preferentially at least partially inside of the base wall (11) and downstream of said retention portion (111) and from the flow regulation means (13), and configured so that the beverage flow can enter in the drinking recipient (1) along a non-vertical direction, or one different from the prevailing flow direction.

Said flow regulation means (13) can be provided as a single piece, produced by means of injection of a synthetic material, and arranged so that extend at least partially inside of said base opening.

According to an inventive aspect, the flow regulation means (13) can present only an upstream portion (131) with an exterior section adapted so that can be retained on the base opening of the base wall (11), or, alternatively, only an upstream portion (131) and a downstream portion (132) presenting an exterior section of different dimension and adapted so that can be both retained in the base opening of the base wall (11). In particular, said retention is provided so that at least most part of the exterior surface of said upstream and downstream portions (131, 132) can be pressure-fitted inside said base opening of the base wall (11).

Moreover, in the case of this embodiment, at least one of said upstream and downstream portions (131, 132) confines an interior flow section of tubular shape upstream of a flow regulation wall (133) that presents a flow passageway (134) extending in a generally transversal manner relative to the prevailing flow direction, and adapted so that can only be enlarged from a closed position to an open position, preferentially in elastic manner, in case of being impinged with an upstream flow pressure bigger than a previously defined value of flow pressure.

A simple e effective construction of said flow regulation means (13) is herewith provided.

It is preferred when the flow regulation means (13) are produced in a material that can be elastically deformed, such as for example FDA silicone.

FIGS. 6 to 11 represent several embodiments of the drinking recipient (1) according to the present invention, including different configurations of the base opening of the base wall (11) and of said flow regulation means (13).

Figure 6:
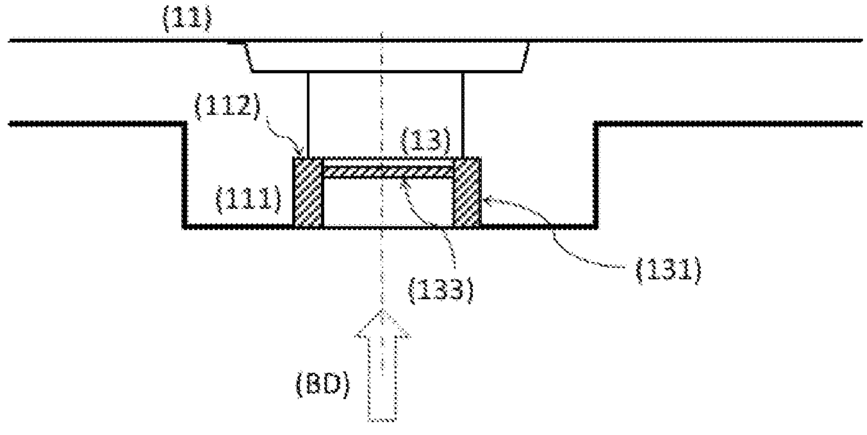
FIG. 6: detail view of a first embodiment of drinking recipient (1) and flow regulation means (13) according to the present invention.
Figure 7:
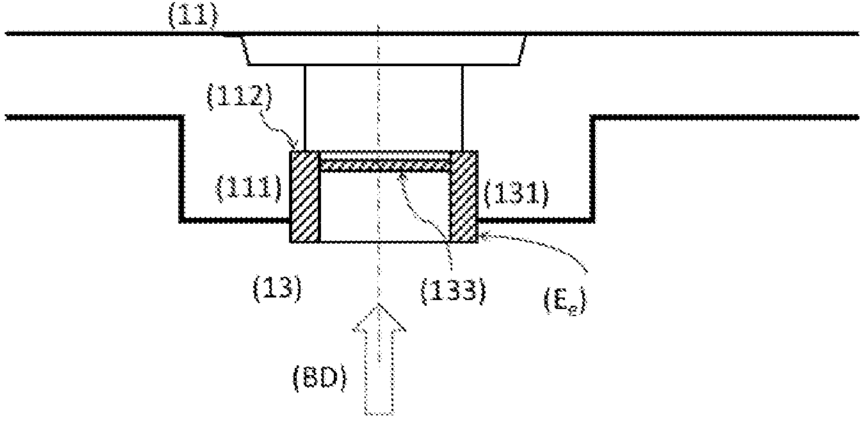
FIG. 7: detail view of a second embodiment of drinking recipient (1) and flow regulation means (13) according to the present invention.

In the case of FIGS. 6 and 7, the flow regulation means (13) present only an upstream portion (131) that is advantageously retained laterally under pressure in a retention part (111) and at a downstream edge by means of support upon a seating portion (112) provided in the base wall (11).

The main difference in this case is the fact that the upstream edge of the flow regulation means (13) projects upstream in a sealing extension (Ee), beyond the base wall (11), thereby simultaneously providing a means of liquid sealing when the drinking recipient (1) is operatively placed in the beverage discharge disposition (2) and engaged by respective discharge means (23).

FIGS. 8 to 11 represent details of the base wall (11) of drinking recipients (1) according to the present invention, but in this case presenting an upstream portion (131) and a downstream portion (132), whereby said portions present exterior sections of different external dimension, for example external diameter.

Figure 8:
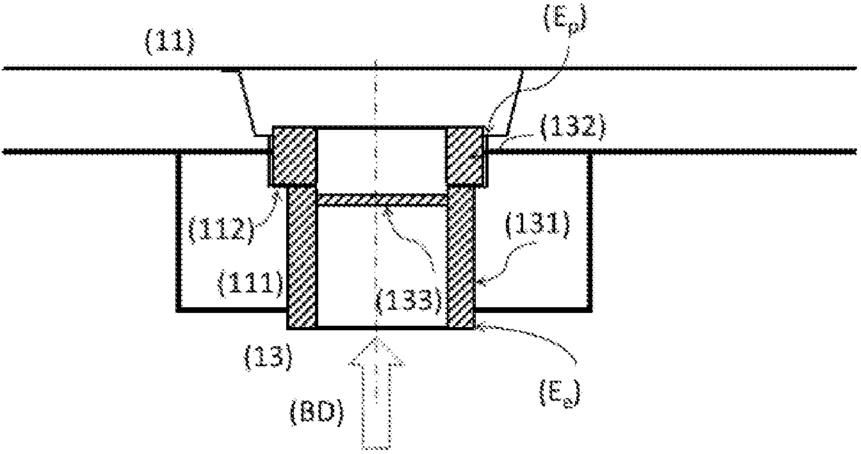
FIG. 8: detail view of a third embodiment of drinking recipient (1) and flow regulation means (13) according to the present invention.
Figure 9:
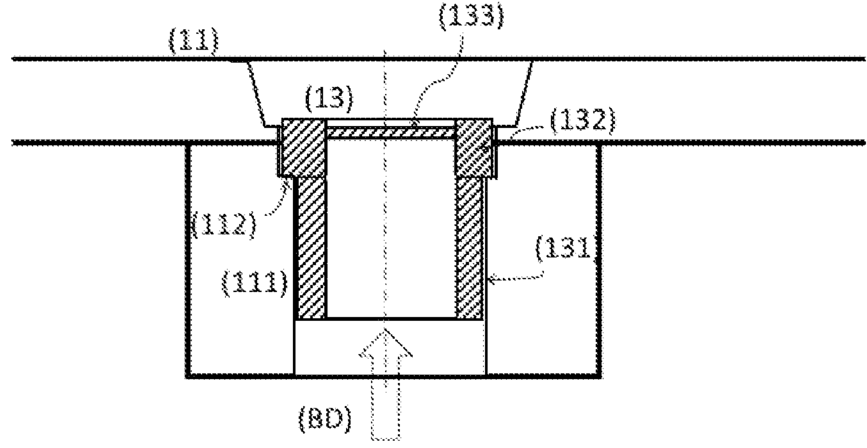
FIG. 9: detail view of a fourth embodiment of drinking recipient (1) and flow regulation means (13) according to the present invention.
Figure 10:
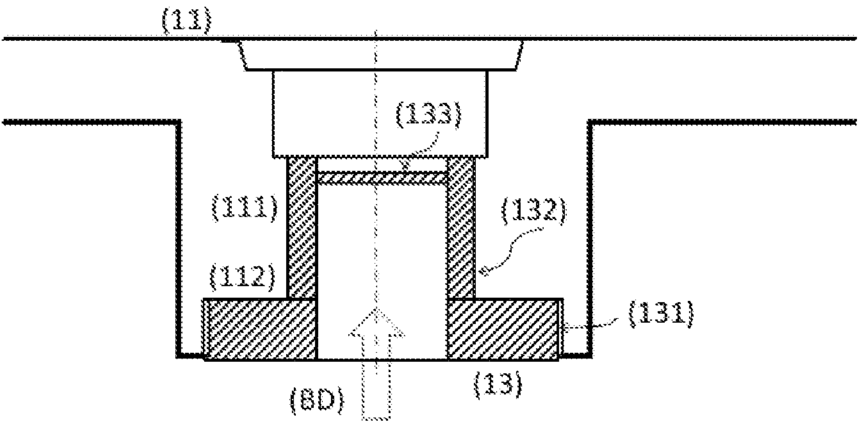
FIG. 10: detail view of a fifth embodiment of drinking recipient (1) and flow regulation means (13) according to the present invention.
Figure 11:
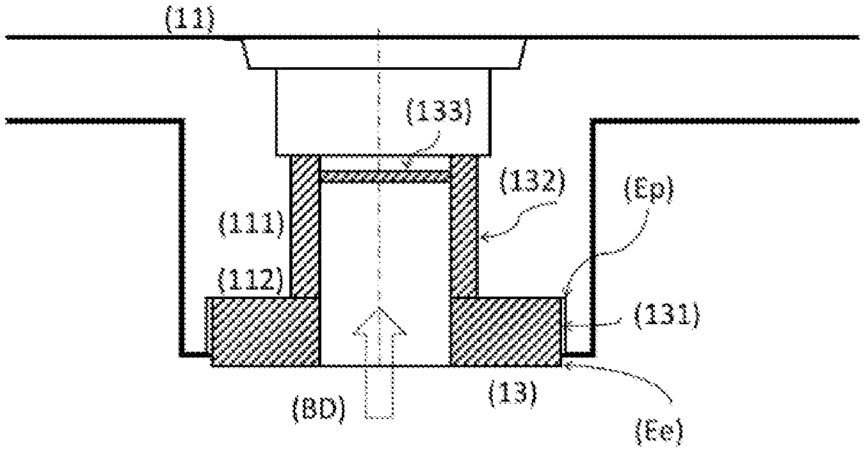
FIG. 11: detail view of a sixth embodiment of drinking recipient (1) and flow regulation means (13) according to the present invention.

In the case of FIGS. 8 and 9, an upstream portion (131) presents a smaller exterior dimension of the transversal section, whereas in the case of FIGS. 10 and 11, the upstream portion (131) presents a bigger exterior dimension of the transversal section.

In all these cases, at least one of said upstream (131) and downstream portions (132) is provided with a transversal dimension at least approximately similar to the transversal dimension of the base opening of the base wall (11), so that is retained by means of pressured-fitting in a respective retention portion (111) of the base opening at the base wall (11).

In the case of the embodiments represented, the flow regulation means (13) are arranged on said seating portion (111) so that results a slot-like perimeter space (E r) associated with one of said upstream and downstream portions (131, 132), and does not result a slot-like perimeter space associated with the other of said upstream and downstream portions (131, 132).

It is herewith advantageously provided the possibility of removing said flow regulation means (13) from the base opening, for example for the purpose of replacing them.

In fact, the drinking recipients (1) according to the present invention are provided so that the flow regulation means (13) can be manually replaced, without requiring the use of a tool for this purpose.

FIGS. 12 to 15 represent two embodiments of flow regulation means (13) comprised in drinking recipients (1) according to the present invention.

Figure 12:
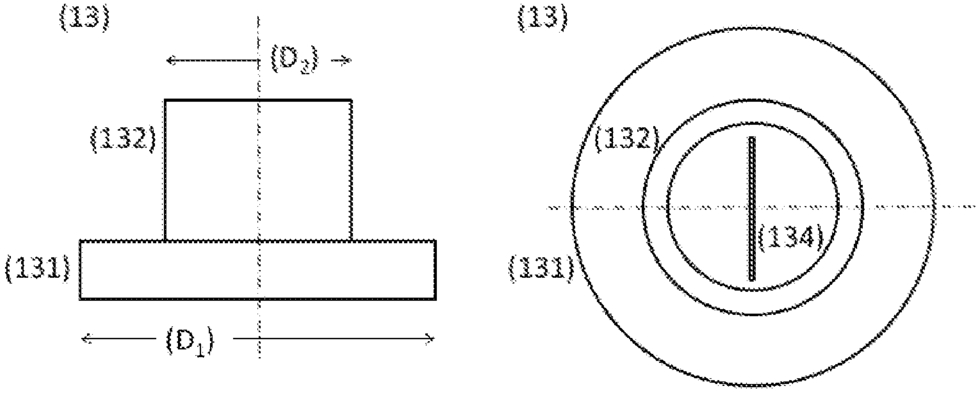
FIG. 12: side and top views of a first embodiment of flow regulation means (13) for a drinking recipient (1) according to the present invention.
Figure 13:
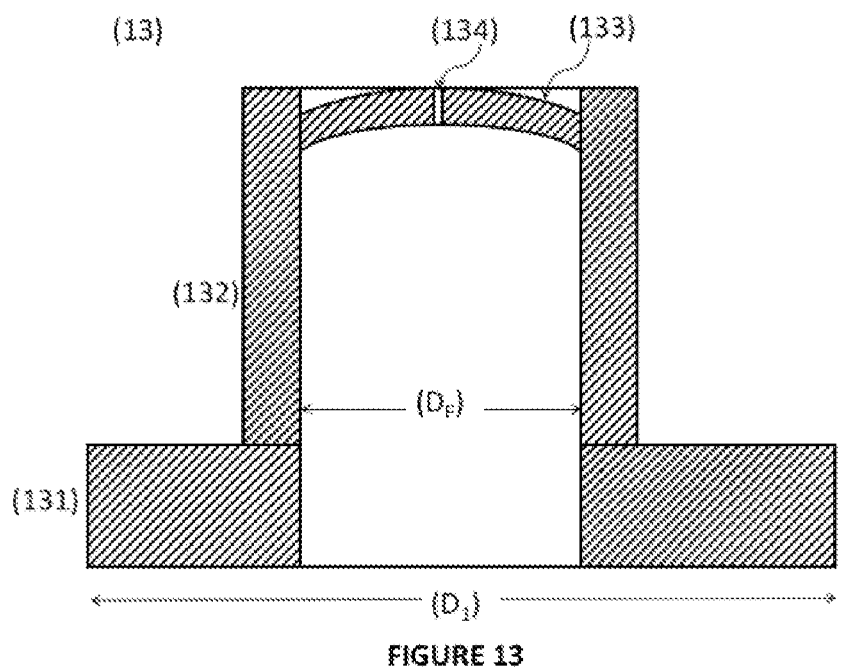
FIG. 13: side-cut view of the embodiment according to FIG. 12.

In the case of FIGS. 12 and 13, the flow regulation means (13) present an upstream portion (131) and a downstream portion (132) of circular transversal section and confining an interior flow section also of circular shape, and comprising a flow regulation wall (133) arranged in the proximity of the downstream edge of said downstream portion (132).

Said flow regulation wall (133) presents a wall thickness that is smaller than the wall thickness of said upstream and downstream portions (131, 132).

In particular, said flow regulation wall (133) is in this case provided with a general shape of semi sphere type, in particular with the cavity oriented upstream.

The flow regulation wall (133) in this case presents a single flow passageway (134) of linear shape and that extends at least approximately along the geometric centre of said flow regulation wall (133).

Said flow regulation means (13) can present at least one, preferentially at least most part of the following dimensional relations:

- maximum dimension along the prevailing flow direction smaller than 8 mm, preferentially smaller than 6 mm;
- maximum dimension along the direction transversal to the prevailing flow direction smaller than 12 mm, preferentially smaller than 11 mm.

In particular, it has been demonstrated as particularly advantageous when the characteristic dimension of the flow passage upstream of the flow regulation wall (133) is smaller than 5 mm, preferentially smaller than 4 mm, and bigger than 1 mm, preferentially bigger than 2 mm.

In particular, is has been shown as particularly advantageous when the characteristic dimension of the flow passage (134) on the flow regulation wall (133), is smaller than 4 mm and bigger than 2 mm.

In fact, it has been established that in this case better elastic opening and closing behaviour of the flow passageway (134) can be attained, as well as more advantageous flow patterns there through, when said flow regulation wall (133) is impinged by an upstream hydraulic flow pressure that is bigger than 1,5 bar, preferentially bigger than 1,8 bar, and smaller than 20 bar, preferentially smaller than 18 bar.

Figure 14:
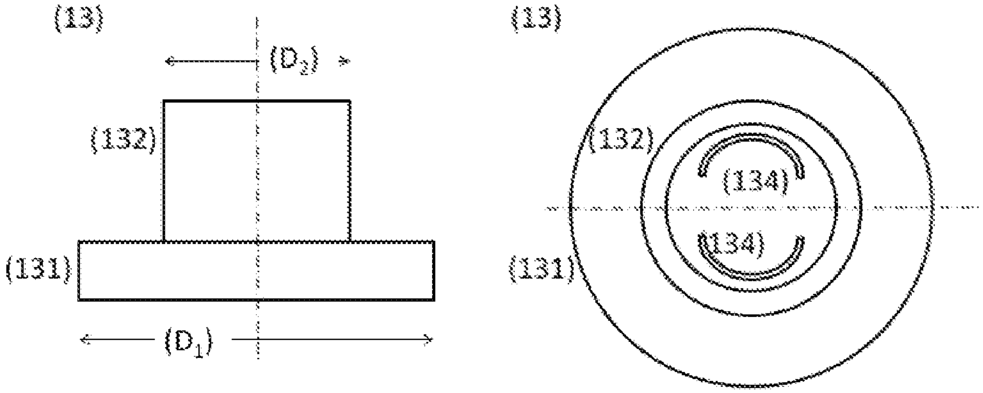
FIG. 14: side and top views of a second embodiment of flow regulation means (13) for a drinking recipient (1) according to the present invention.
Figure 15:
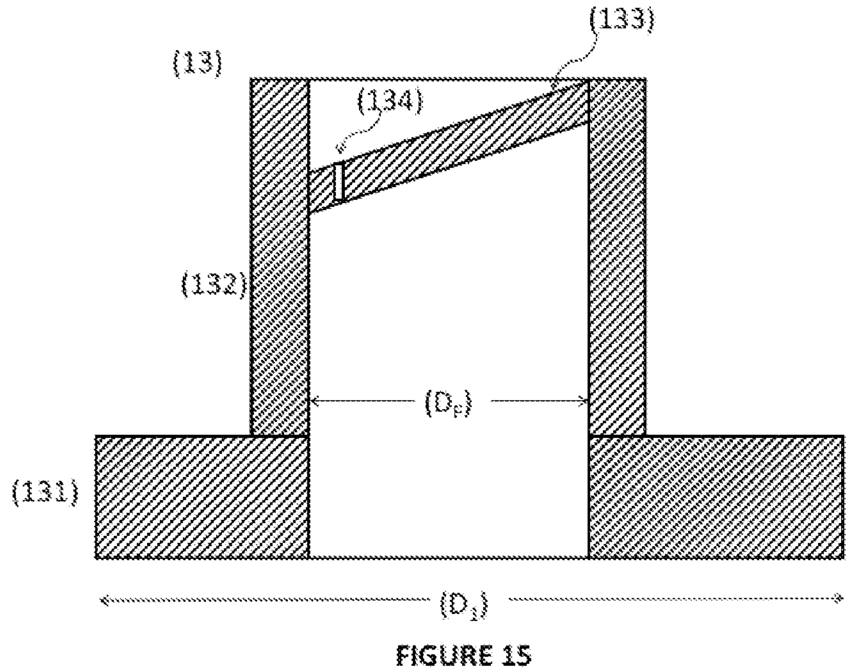
FIG. 15: side-cut view of the embodiment according to FIG. 14.

In the case of FIGS. 14 and 15, said flow regulation wall (133) is provided with an at least approximately planar shape and extending in a plane different from the prevailing flow direction, in particular in a plane oblique relative hereto.

Moreover, the flow regulation wall (133) in this case presents two flow passageways (134) of curved shape and preferentially arranged in the proximity of perimeter of the flow regulation wall (133).

The invention claimed is:

1. A drinking recipient comprising:

a base wall and a sidewall extending from the base wall thereby confining a fluid collection volume of the drinking recipient, and collecting a beverage discharged through the base wall in a prevailing flow direction opposite the direction of the gravity force, wherein the base wall has a base opening extending along the prevailing flow direction and comprises flow regulation means configured to only provide flow passage in case of being impinged with an upstream flow pressure bigger than a previously defined value of flow pressure, the flow regulation means is a single piece that regulates the flow passage and that provides liquid sealing of the base wall, the flow regulation means extends at least partially inside of the base opening, the flow regulation means present:

only an upstream portion with an exterior surface, and wherein the flow regulation means is configured to be removably retained on the base opening, or the upstream portion and a downstream portion with an exterior surface, and wherein the flow regulation means is configured to be removably retained on the base opening, and wherein at least one of the upstream portion and the downstream portion has a tubular shape confining a flow passage section upstream of a flow regulation wall of the flow regulation means, the flow regulation wall comprising at least one flow passageway extending transversally relative to the prevailing flow direction and the at least one flow passageway being configured to be elastically enlarged from a closed position to an open position, in case of being impinged with the upstream flow pressure bigger than the previously defined value of flow pressure.

2. The drinking recipient according to claim 1, wherein the base opening comprises at least one retention portion with a width similar to the width of at least one of the upstream portion and the downstream portion of the flow regulation means such that at least one of the upstream portion and the downstream portion is pressure-fitted inside the base opening, and the base opening comprises at least one seating portion having at least one surface extending in a rim-like manner in a transversal direction relative to the prevailing flow direction, said at least one seating portion reducing a diameter of said base opening.

3. The drinking recipient according to claim 2, wherein the upstream portion extends at least partially outside of the base wall.

4. The drinking recipient according to claim 2, wherein the downstream portion extends at least partially outside of the at least one retention portion.

5. The drinking recipient according to claim 1, wherein the flow regulation means is configured such that at least one of:

said upstream portion comprises the flow regulation wall arranged at least in a proximity of a downstream edge of the upstream portion, or said downstream portion comprises the flow regulation wall arranged at least in the proximity of a downstream edge of the downstream portion, and a wall thickness of the flow regulation wall is smaller than at least one of a wall thickness of the said upstream portion and the said downstream portion.

6. The drinking recipient according to claim 1, wherein the at least one flow passageway is slot-like, with at least one of: a linear shape and a curved shape, and the at least one flow passageway only opens in case of being impinged with the flow pressure bigger than the previously defined value of flow pressure.

7. The drinking recipient according to claim 2, wherein the upstream portion extends completely inside of the base wall with at least most of the upstream portion extending along the prevailing flow direction inside of said at least one retention portion.

8. The drinking recipient according to claim 2, wherein the downstream portion extends completely inside of said base wall with at least a majority extending inside of said at least one retention portion along the prevailing flow direction.

9. The drinking recipient according to claim 1, wherein the upstream portion has an exterior dimension in a direction transverse to the prevailing flow direction different from an exterior dimension of the downstream portion.

10. The drinking recipient according to claim 1, wherein the upstream portion comprises a transversal section of flow passage that is similar to the transversal section of the flow passage of the downstream portion, and the upstream portion has an upstream-oriented surface that extends in a rim-like transversal extension beyond the flow passage section and provides a perimeter surface configured for liquid sealing of said flow passage.

11. The drinking recipient according to claim 1, wherein the flow regulation means has at least one of:

a maximum length along the prevailing flow direction of 8 mm;

a maximum width along the direction transversal to the prevailing flow direction of 12 mm;

a flow width of the flow passage section upstream of the flow regulation wall smaller than 10 mm; or a width dimension of the at least one flow passageway on the flow regulation wall smaller than 7 mm.

12. The drinking recipient according to claim 2, wherein an exterior contour of at least one of said upstream portion and said downstream portion is similar to an interior contour of a respective retention portion of the at least one retention portion, and the flow regulation means is pressured fitted to the respective retention portion by at least one of said downstream portion or said upstream portion.

13. The drinking recipient according to claim 2, wherein the flow regulation means is arranged on the at least one seating portion with a slot-like perimeter space associated with one of said upstream portion and said downstream portion, not the other one of said upstream portion and said downstream portion.

14. The drinking recipient according to claim 2, wherein the flow regulation means is arranged on the at least one seating portion with at least an upstream-oriented face of said upstream portion being aligned with, or being projected in an engagement extension above of, an upstream-oriented face of said base opening of the base wall.

15. The drinking recipient according to claim 1, wherein the drinking recipient is configured to be operatively placed on a beverage discharge disposition functionally connected to a beverage preparation apparatus and retained, via a base region, to the beverage discharge disposition by means of mechanical engagement, and the drinking recipient further comprises flow constraining means associated with the base opening, to control the beverage flow to enter the drinking recipient along a non-vertical direction or a direction different from the prevailing flow direction.

16. The drinking recipient according to claim 1, wherein the liquid sealing of the base wall prevents radial flow, and the flow regulations means contacts the base wall.

17. A system for distribution of edible products, comprising:

the drinking recipient according to claim 1;

an individual portion of an edible substance; and a beverage preparation apparatus comprising:

a beverage discharge disposition configured to provides support for operative placement of the drinking recipient, and comprising discharge means configured to discharge a beverage discharge (BD) along the prevailing flow direction opposite to the direction of the gravity force into the drinking recipient;

a beverage preparation device configured to be actuated between a first and second position, and vice-versa, to collect and eject the individual portion, wherein the drinking recipient is configured to be placed in operative position of beverage discharge and retained on the beverage discharge disposition, the drinking recipient and beverage discharge are configured for, based on the drinking recipient being in the operative position, direct contact between the flow regulation means of the drinking recipient and the discharge means through which the flow regulation means is compressed by the discharge means along the prevailing flow direction, and the upstream portion of the flow regulation means provides the only liquid sealing means of a fluid connection between the drinking recipient and beverage discharge disposition.

18. A process for operating a drinking recipient, comprising:

providing the drinking recipient according to claim 1;

providing a beverage preparation apparatus comprising beverage discharge means; and placing the drinking recipient on a beverage discharge disposition of the beverage preparation apparatus, and moving the drinking recipient to an operative position where the beverage discharge disposition retains the drinking recipient;

wherein the beverage discharge means elastically compresses the upstream portion of the flow regulation means provided on a base region of said drinking recipient when the drinking recipient is moved to said operative position, and the upstream portion of the flow regulation means provides the liquid sealing between the drinking recipient and the beverage discharge disposition.

* * * * *